United States Patent
Kim et al.

(10) Patent No.: US 8,830,042 B2
(45) Date of Patent: Sep. 9, 2014

(54) HAPTIC FEEDBACK DEVICE

(71) Applicant: Samsung Electro-Mechanics Co., Ltd, Suwon (KR)

(72) Inventors: Jae Kyung Kim, Suwon (KR); Dong Sun Park, Suwon (KR); Dae Woong Yun, Suwon (KR); Yeon Ho Son, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 72 days.

(21) Appl. No.: 13/668,962

(22) Filed: Nov. 5, 2012

(65) Prior Publication Data
US 2013/0162415 A1    Jun. 27, 2013

(30) Foreign Application Priority Data
Dec. 26, 2011    (KR) .................. 10-2011-0142688

(51) Int. Cl.
*H04B 3/36*    (2006.01)
(52) U.S. Cl.
USPC .................................................. 340/407.1

(58) Field of Classification Search
USPC ............ 340/407.1, 582, 665, 4.2, 407.2, 7.6, 340/4.12; 310/324, 330
See application file for complete search history.

(56) References Cited

U.S. PATENT DOCUMENTS

| | | |
|---|---|---|
| 2007/0013270 A1 | 1/2007 | Sashida et al. |
| 2008/0136292 A1* | 6/2008 | Thiesen ........................ 310/334 |
| 2009/0197648 A1 | 8/2009 | Cheon et al. |
| 2011/0187514 A1* | 8/2011 | Dong et al. ................. 340/407.1 |
| 2011/0205165 A1* | 8/2011 | Pfau et al. ..................... 345/173 |
| 2011/0248817 A1* | 10/2011 | Houston et al. ................ 340/4.2 |
| 2012/0104901 A1* | 5/2012 | Jiang et al. ..................... 310/330 |

FOREIGN PATENT DOCUMENTS

| | | |
|---|---|---|
| KR | 10-2005-0012126 | 1/2005 |
| KR | 10-2007-0019332 | 2/2007 |
| KR | 10-2008-0042560 | 5/2008 |
| KR | 10-2011-0045486 | 5/2011 |

* cited by examiner

*Primary Examiner* — Phung Nguyen
(74) *Attorney, Agent, or Firm* — Staas & Halsey LLP

(57) ABSTRACT

There is provided a haptic feedback device. The haptic feedback device includes a vibration member; a vibration element formed on the vibration member to vibrate the vibration member; and a mass member formed on the vibration member to adjust a oscillation frequency of the vibration member, wherein one surface of the mass member facing the vibration member is formed to have a curved shape.

9 Claims, 5 Drawing Sheets

HAPTIC FEEDBACK DEVICE

CROSS-REFERENCE TO RELATED APPLICATIONS

This application claims the priority of Korean Patent Application No. 10-2011-0142688 filed on Dec. 26, 2011, in the Korean Intellectual Property Office, the disclosure of which is incorporated herein by reference.

BACKGROUND OF THE INVENTION

1. Field of the Invention

The present invention relates to a haptic feedback device, and more particularly, to a haptic feedback device able to prevent a vibration member (for example, a vibration plate) from being deformed by an external shock.

2. Description of the Related Art

To increase user convenience, a touch input/output device (for example, a haptic feedback device) in which selection buttons are displayed on a screen has come into general use.

In a haptic feedback device, a user may directly input signals using a fingertip or the like, allowing input signals to be conveniently input to a device for the control thereof, while the user visually confirms output information.

A haptic feedback device may achieve savings in space, improved operability, and simplicity, and enable a user to easily interact with a device. Besides, a haptic feedback device may provide a satisfactory complimentary relationship with IT devices. Therefore, a haptic feedback device has been widely utilized as an input/output device for a guide device for providing users with information in public places (for example, train stations, hospitals, schools, and the like).

Meanwhile, the haptic feedback device is used for providing notification as to whether input signals have been received or whether output signals have been output.

The haptic feedback device includes a vibration element (for example, a piezoelectric element) and a vibration member vibrated by the vibration element.

However, the vibration member provided in the haptic feedback device may be a thin plate member for improving vibration characteristics, and therefore, in the case that a shock is applied to the haptic feedback device (for example, if a user drops the haptic feedback device), the haptic feedback device may be easily deformed or broken.

SUMMARY OF THE INVENTION

An aspect of the present invention provides a haptic feedback device that may prevent the deterioration of vibration characteristics due to an external shock (particularly, a drop shock).

According to an aspect of the present invention, there is provided a haptic feedback device including: a vibration member; a vibration element formed on the vibration member to vibrate the vibration member; and a mass member formed on the vibration member to adjust a oscillation frequency of the vibration member, wherein one surface of the mass member facing the vibration member is formed to have a curved shape.

The one surface of the mass member may be formed to have the curved shape having a smaller curvature than a radius of curvature formed when the vibration member is deformed by vibrations of the vibration element.

The vibration member may include a first plate member to which the vibration element is fixedly attached; and a second plate member extended from the first plate member and housing the mass member.

The second plate member may be extended from a side surface of the first plate member, and be formed to be bent in a direction perpendicular to the first plate member.

The first plate member and the second plate member may be integrally formed by press processing.

The haptic feedback device may further include a shock absorbing member formed between the vibration member and the mass member to prevent contact between the vibration member and the mass member.

The shock absorbing member may be formed on one surface of the vibration member.

The shock absorbing member may be formed with the mass member.

One surface of the shock absorbing member may be formed to have a curved shape.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
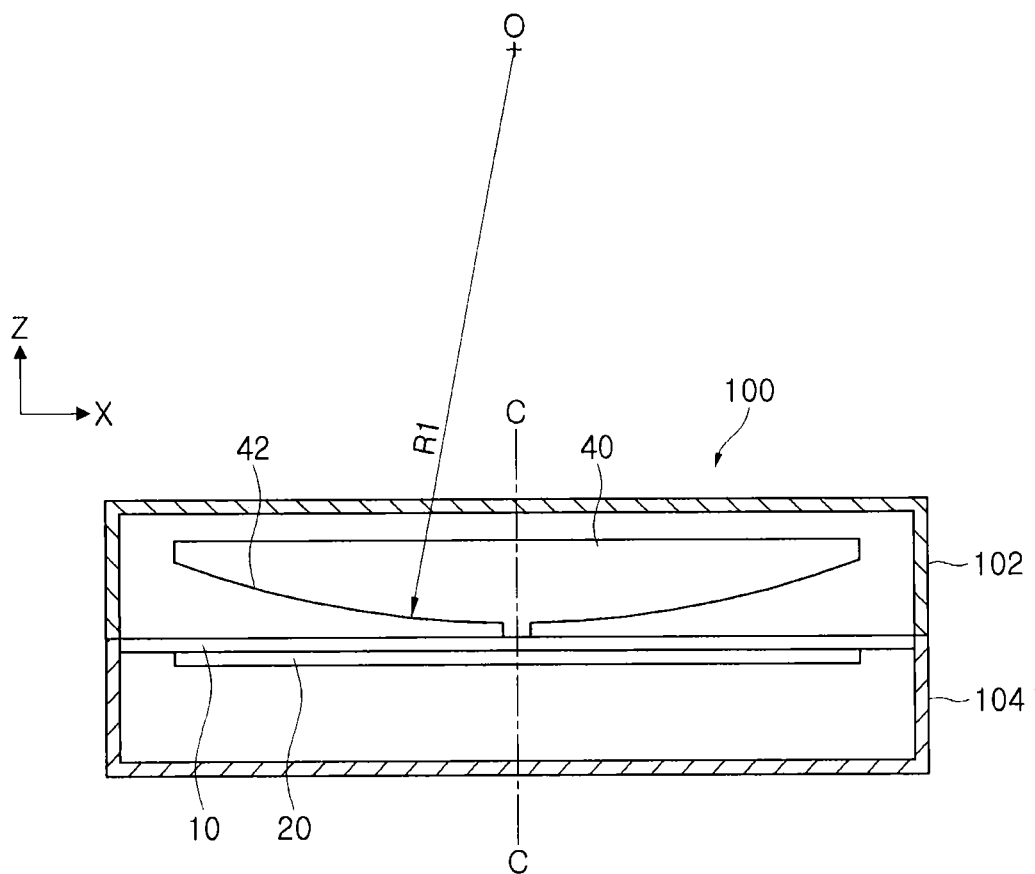
FIG. 1 is a cross-sectional view showing a haptic feedback device according to a first embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
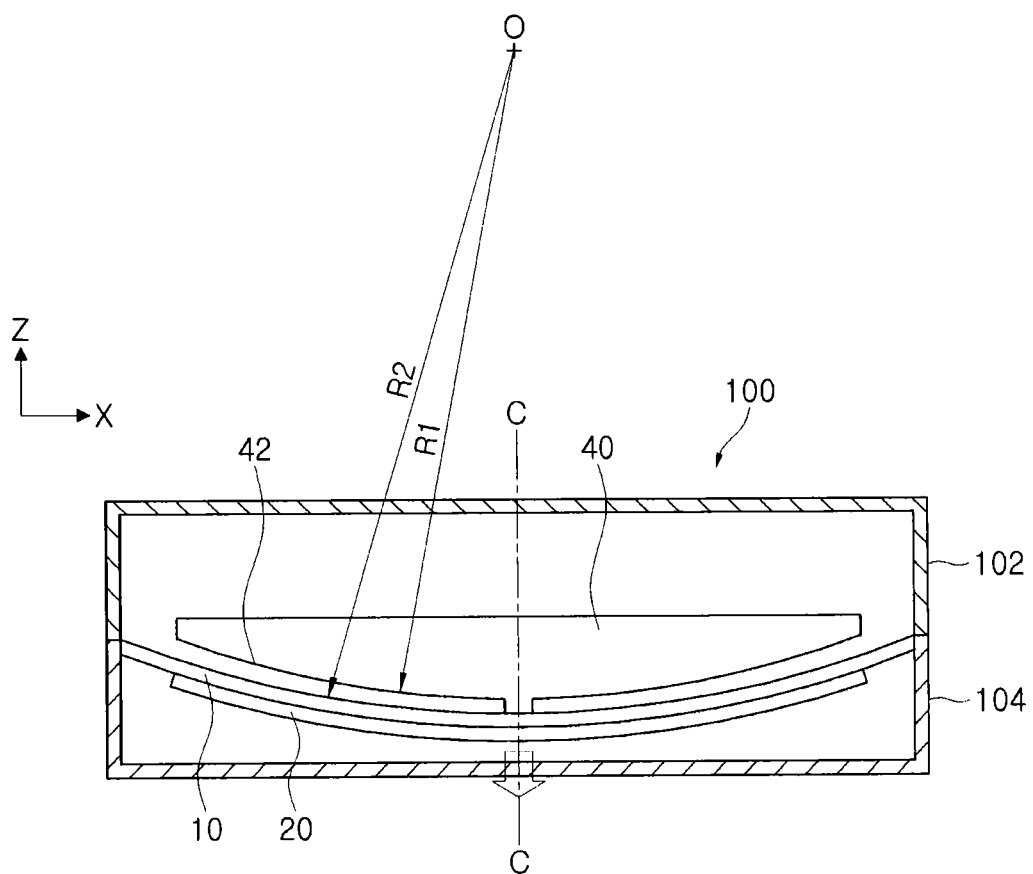
FIG. 2 is a cross-sectional view showing the haptic feedback device of FIG. 1 in an operating state.
Figure 3:
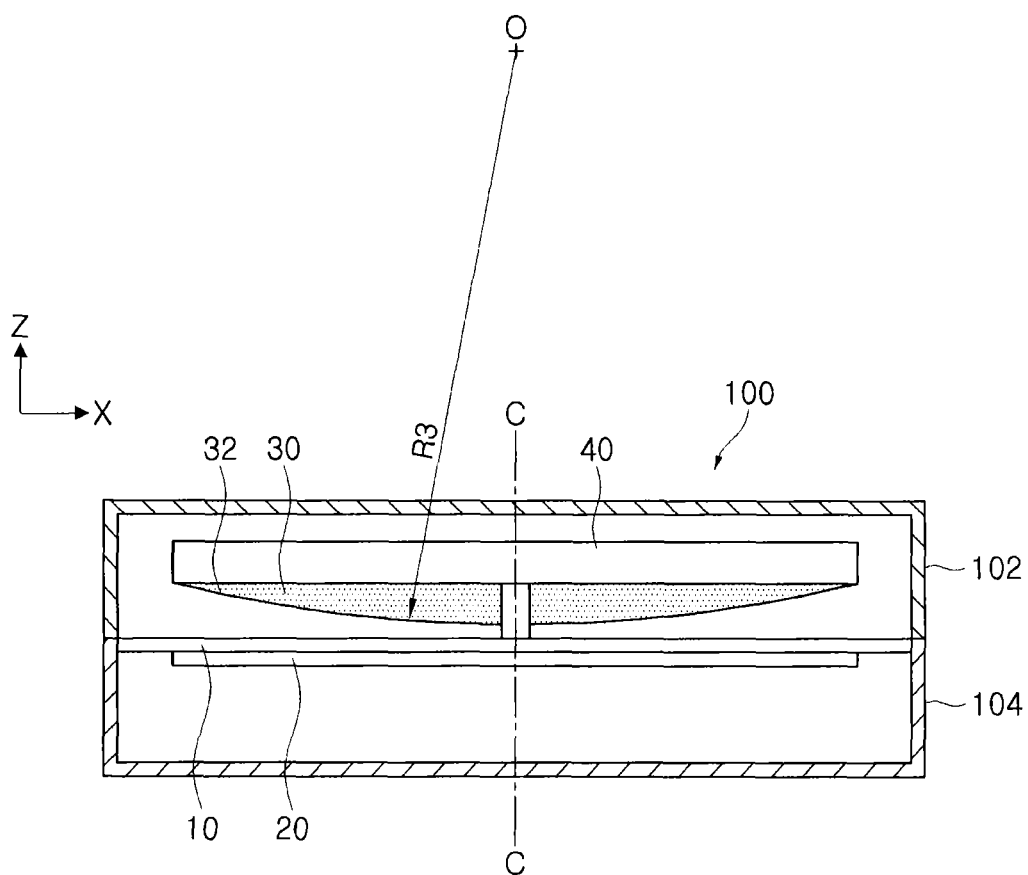
FIGS. 3 and 4 are cross-sectional views showing a haptic feedback device according to a second embodiment of the present invention.
Figure 4:
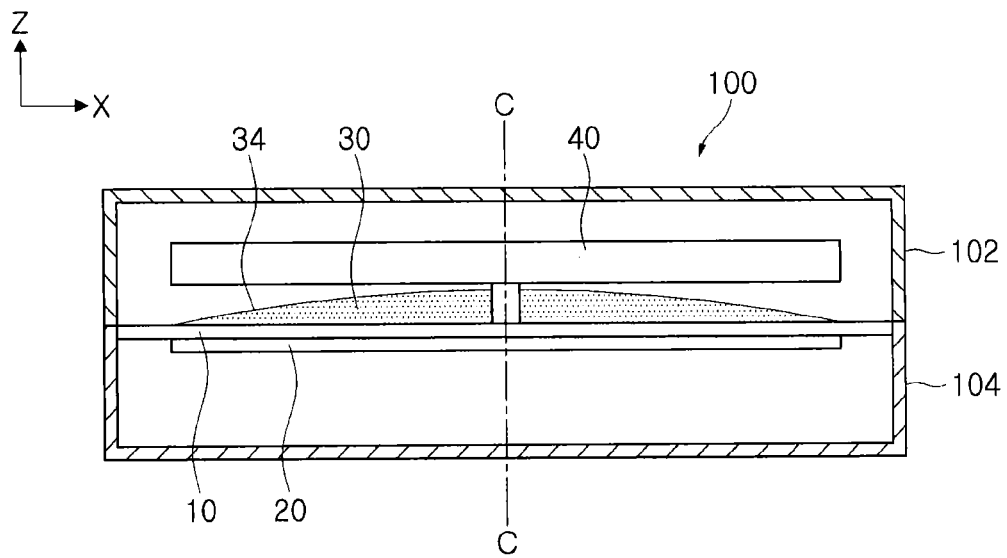
Figure 5:
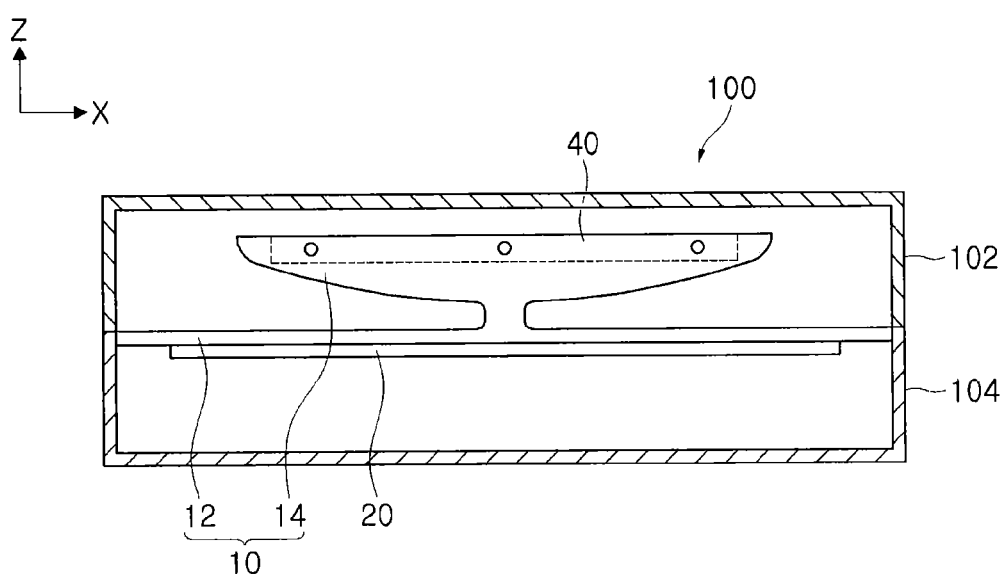
FIG. 5 is a cross-sectional view showing a haptic feedback device according to a third embodiment of the present invention.
Figure 6:
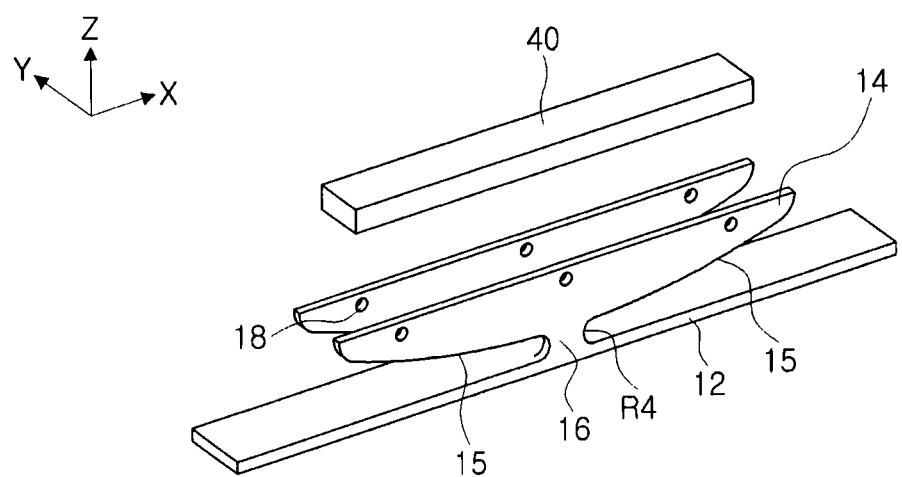
FIG. 6 is a perspective view showing a vibration member of the haptic feedback device of FIG. 5.

FIG. 1 is a cross-sectional view showing a haptic feedback device according to a first embodiment of the present invention, FIG. 2 is a cross-sectional view showing the haptic feedback device of FIG. 1 in an operating state, FIGS. 3 and 4 are cross-sectional views showing a haptic feedback device according to a second embodiment of the present invention, FIG. 5 is a cross-sectional view showing a haptic feedback device according to a third embodiment of the present invention, and FIG. 6 is a perspective view showing a vibration member of the haptic feedback device of FIG. 5.

A haptic feedback device 100 according to a first embodiment of the present invention will be described with reference to FIGS. 1 and 2.

The haptic feedback device 100 according to the first embodiment of the present invention may include cases 102 and 104, a vibration member 10, a vibration element 20, and a mass member 40. The haptic feedback device 100 having the above-described configuration may be mounted in other portable electronic apparatuses such as a portable phone, a portable electronic dictionary, or the like.

In addition, the haptic feedback device 100 is connected to an input/output device of a corresponding electronic apparatus to thereby transmit vibration signals to a user. However, the haptic feedback device 100 according to the embodiment of the present invention is not limited to the above-described portable electronic apparatuses, and may be installed in an automatic teller machine (ATM) including a touch screen, a subway route guidance system in a subway station, or the like. In addition, the haptic feedback device 100 may be mounted and used in other electronic apparatuses requiring the output of vibrations.

The cases 102 and 104 may include an upper case 102 and a lower case 104. The cases 102 and 104 may protect the haptic feedback device 100 against an external shock. For this, the cases 102 and 104 may be manufactured using a metal having impact resistance. However, to lighten the haptic feedback device 100, the cases 102 and 104 may be manufactured using plastic. In this case, the plastic may include components able to increase impact resistance.

The cases 102 and 104 may be mounted in an electronic apparatus in which the haptic feedback device 100 is mounted, so as to be separated from and connected to the electronic apparatus. Alternatively, at least a part of the cases 102 and 104 (for example, the upper case 102 or the lower case 104) may be integrally formed with a portable electronic apparatus (for example, a portable phone) in which the haptic feedback device 100 is mounted. In addition, the upper case 102 or the lower case 104, or the upper case 102 and the lower case 104 may be a part of the portable electronic apparatus.

In addition, the cases 102 and 104 may include an electrode for receiving electrical signals from the portable electronic apparatus. The electrode may be formed outside of the cases 102 and 104, and supply current to the vibration element 20 mounted in the device.

Meanwhile, the upper case 102 and the lower case 104 may both be connectable and separable. For example, the upper case 102 and the lower case 104 may be connected by nuts and bolts. Alternatively, the upper case 102 and the lower case 104 may be connected by a separate fitting structure (for example, protrusions and grooves).

The vibration member 10 may be manufactured to be a thin plate with a substantially rectangular cross section. However, the vibration member 10 may be manufactured to have shapes other than the rectangular shape, as long as the vibration member 10 can be vibrated in a vertical direction.

The vibration member 10 may be manufactured using a material having a predetermined level of elasticity. For example, the vibration member 10 may be formed of metal, plastic, or the like. In addition, in the vibration member 10, a spring constant K may be determined so that the haptic feedback device 100 has a predetermined range of vibrational frequencies (100 to 300 Hz). For example, a length and a thickness of the vibration member 10 may be adjusted so that the haptic feedback device 100 has vibrational frequencies of 100 to 300 Hz.

The vibration member 10 may be fixed to the cases 102 and 104. Specifically, both ends of the vibration member 10 may be connected to the cases 102 and 104. More specifically, both ends of the vibration member 10 may be fixed to the upper case 102 or the lower case 104, or may be simultaneously fixed to the upper case 102 and the lower case 104.

Here, both ends of the vibration member 10 may be connected to the cases 102 and 104 through a welding method or a bolt fastening method. However, a connection method between the vibration member 10 and the cases 102 and 104 is not limited to the above-described methods, and may be changed within a range capable of being recognized by a person having ordinary skill in the art.

Since the vibration member 10 mounted in the cases 102 and 104 has a predetermined level of elasticity as described above, the vibration member 10 may be vibrated in a vertical direction (a Z-axis direction, based on FIG. 1) by external forces. For reference, the vibration member 10 may be contracted and extended for smooth vertical vibrations. However, a range of the contraction and extension of the vibration member may not be outside of a range of elastic deformation of the material constituting the vibration member 10.

The vibration element 20 may be fixed to the vibration member 10. Specifically, the vibration element 20 may be adhered to the vibration member 10 by an adhesive. Here, the adhesive may be an epoxy resin or a resin which can be cured by UV light. In addition, the vibration element 20 may be fixed to the vibration member 10 in a mechanical structure. For this, a groove in which the vibration element 20 is fitted may be formed in the vibration member 10. In addition, a protrusion for fixing a position of the vibration element 20 may be formed on the vibration member 10.

The vibration element 20 may be a piezoelectric element that can be freely contracted and extended according to electrical signals. For example, the vibration element 20 may be manufactured using PZT (Lead Zirconium Titanite Ceramic). The vibration element 20 configured as above may be contracted and extended according to the electrical signals to thereby generate vibrations in the vibration member 10.

The vibration element 20 may be formed to be elongated in the longitudinal direction of the vibration member 10. Specifically, the vibration element 20 may be disposed at a center of the vibration member 10 so as not to hinder vertical vibrations of the vibration member 10. In addition, the vibration element 20 may be shorter than the vibration member 10.

The mass member 40 may be connected to the vibration member 10. Specifically, the mass member 40 may be connected to the vibration member 10 at a point which coincides with a line segment C-C for dividing the vibration member 10 into two equal parts in an X-axis direction. The connection between the mass member 40 and the vibration member 10 may be carried out by a fastening member such as a bolt, or the like, or by an adhesive. Alternatively, the mass member 40 and the vibration member 10 may be connected through an auxiliary tool such as a clip, a clamp, or the like.

The mass member 40 may have a predetermined mass, and reduce vibrational frequencies of a vibration generating device. For reference, the mass member 40 may be manufactured using a single material such as tungsten, nickel, or copper, or a mixed material containing at least one of tungsten, nickel, and copper.

Meanwhile, according to the present embodiment, the mass member 40 may have a surface having a curved shape. Specifically, a first surface 42 of the mass member 40 which faces the vibration member 10 may have a curved shape. That is, the first surface 42 of the mass member 40 may have a curved shape having a radius R1 with respect to an X-Z plane. Here, the radius R1 may be smaller than a radius of curvature (R2) formed when the vibration member 10 is bent by vibrations, as shown in FIG. 2.

In this manner, the mass member 40 having the curved shape may not contact the vibration member 10 or collide with the vibration member 10 when the vibration member 10 vibrates (that is, when the vibration member 10 is bent and deformed).

Accordingly, according to the present embodiment, when the vibration member 10 is vibrated in a vertical direction (a direction based on FIG. 1) by the vibration element 20, or an external shock, the vibration member 10 may not collide with the mass member 40.

In addition, even when the vibration member 10 collides with the mass member 40, since the first surface 42 of the mass member 40 has the curved shape, a phenomenon in which the vibration member 10 is deformed due to contact with a part (for example, a corner) of the mass member 40 may not occur. That is, in the present embodiment, the vibration member 10 may uniformly contact the first surface 42 of the mass member 40, and therefore a shock energy generated at the time of contact does not concentrate on a part of the vibration member 10.

Accordingly, the deformation of the vibration member 10 may not occur even at the time of contact between the vibration member 10 and the mass member 40.

In this manner, the haptic feedback device 100 according to the present embodiment may provide constant vibrational frequencies because the vibration member 10 is hardly deformed by a shock caused by external force.

Next, a haptic feedback device according to a second embodiment of the invention will be described with reference to FIGS. 3 and 4.

The haptic feedback device 100 according to the present embodiment differs from the haptic feedback device according to the first embodiment, in that the haptic feedback device 100 according to the second embodiment further includes a shock absorbing member 30.

The shock absorbing member 30 may be formed with the mass member 40 or the vibration member 10 as of FIGS. 3 and 4, and have a curved surface. For example, the shock absorbing member 30 may be formed on one surface (a surface facing the vibration member 10) of the mass member 40, and a surface 32 facing the vibration member 10 may have a curved shape. Here, a radius of curvature (R3) of the surface 32 may be smaller than or equal to the radius of curvature (R2, see FIG. 2) formed when the vibration member 10 is deformed.

In addition, the shock absorbing member 30 may be formed on one surface (a surface facing the mass member 40) of the vibration member 10, and a surface 34 facing the mass member 40 may have a curved shape. However, it is unnecessary that the corresponding surface 34 has the curved shape. That is, the shock absorbing member 30 has an inclined surface whose angle of inclination is gradually reduced toward both ends of the vibration member 10 based on a connection point between the vibration member 10 and the mass member 40.

In the present embodiment configured as above, the vibration member 40 having a relatively high level of hardness does not need to have a curved surface, such that it may be effectively applied to the production of a small haptic feedback device.

Next, a haptic feedback device according to a third embodiment of the present invention will be described with reference to FIGS. 5 and 6.

The haptic feedback device 100 according to the present embodiment may differ from the haptic feedback device according to the above-described embodiments in terms of the shape of the vibration member 10.

The vibration member 10 according to the present embodiment may include a first plate member 12 and a second plate member 14.

The first plate member 12 may be formed as a thin plate, and may be a vibration member substantially vibrated in a vertical direction. Both ends of the first plate member 12 may be fixed to the cases 102 and 104. The first plate member 12 may be formed of metal, plastic, or the like. In addition, the first plate member 12 may have a predetermined spring constant K. Here, the spring constant K of the first plate member 12 may be determined to be within a range in which the haptic feedback device 100 has vibrational frequencies of 100 to 300 Hz.

A fastening hole for fastening the first plate member 12 and the cases 102 and 104 may be formed in the first plate member 12. That is, the first plate member 12 may be fixed to the cases 102 and 104 through a fastening member (a bolt, a pin, or the like).

In addition, the first plate member 12 may include a connection portion 16 connected to the second plate member 14. The connection portion 16 may be extended from both side surfaces of the first plate member 12, and may be formed near a point at which the first plate member 12 is divided into two equal parts in a longitudinal direction thereof. In addition, the side surface of the connection portion 16 may be a curved surface having a radius R4. The connection portion 16 having the above-described shape may minimize a load of the mass member 40 being concentrated on a part of the first plate member 12.

The second plate member 14 may be connected to the first plate member 12. Specifically, the second plate member 14 may be integrally connected to the first plate member 12 through the connection portion 16. More specifically, the second plate member 14 may be integrally formed with the first plate member 12 by press processing. The second plate member 14 may be bent in a direction perpendicular to the first plate member 12.

The second plate member 14 may have a predetermined mass so that the haptic feedback device 100 has a relatively low vibrational frequency. Alternatively, the second plate member 14 may have a shape capable of housing the mass member 40 having a predetermined mass. For example, the second plate member 14 may be firmly connected to the mass member 40 in such a manner that both ends of the second plate member 14 are bent in the same direction as depicted in FIG. 6.

In addition, one surface 15 (a surface facing the first plate member 12) of the second plate member 14 may have a curved shape, and the radius of curvature of the curved surface may be smaller than the radius of curvature (R2, see FIG. 2) formed when the vibration member 10 is deformed.

In addition, a plurality of holes 18 may be formed in the second plate member 14. The holes 18 may be formed at regular intervals in a longitudinal direction (an X-axis direction based on FIG. 6) of the second plate member 14, and a fastening member such as a bolt or the like may be fitted to the holes 18. That is, the holes 18 may be used to fix the mass member 40 to the second plate member 14.

The mass member 40 may be connected to the second plate member 14. Specifically, the mass member 40 may be forcedly fitted to the second plate member 14, be attached to the second plate member 14 by an adhesive, or be connected to the second plate member 14 using a fastening member such as a bolt. The mass member 40 according to the present embodiment may have a size capable of being completely housed in a space formed by the second plate member 14. That is, the mass member 40 may have a size so as not to protrude to the surface 15 of the second plate member 14.

Accordingly, according to the present embodiment, the first plate member 12 and the mass member 40 may not directly collide with each other when the vibration member 10 is vibrated.

Meanwhile, although not shown, a shock absorbing member for reducing or blocking direct contact between the first plate member 12 and the second plate member 14 or between the first plate member 12 and the mass member 40 may be further formed in the space formed by the second plate member 14.

In the present embodiment configured as above, the vibration member 10 and the mass member 40 may be easily connected to each other, and contact between the vibration member 10 and the mass member 40 may be blocked without forming the curved surface on the mass member 40.

As set forth above, according to embodiments of the present invention, one surface of a mass member that may collide with a vibration member has a curved shape, and therefore the occurrence of a phenomenon in which the vibration member is deformed by contact between the vibration member and the mass member may be significantly reduced.

Accordingly, according to embodiments of the present invention, vibrational frequencies of the haptic feedback device may be constantly maintained.

While the present invention has been shown and described in connection with the embodiments, it will be apparent to those skilled in the art that modifications and variations can be made without departing from the spirit and scope of the invention as defined by the appended claims.

What is claimed is:

1. A haptic feedback device comprising:
   a vibration member;
   a vibration element formed on the vibration member to vibrate the vibration member; and
   a mass member formed on the vibration member to adjust an oscillation frequency of the vibration member,
   wherein one surface of the mass member facing the vibration member is formed to have a curved shape, and
   wherein the vibration member includes a first plate member to which the vibration element is fixedly attached and a second plate member extended from the first plate member and housing the mass member.

2. The haptic feedback device of claim 1, wherein the one surface of the mass member is formed to have the curved shape having a smaller curvature than a radius of curvature formed when the vibration member is deformed by vibrations of the vibration element.

3. The haptic feedback device of claim 1, wherein the second plate member is extended from a side surface of the first plate member, and is formed to be bent in a direction perpendicular to the first plate member.

4. The haptic feedback device of claim 1, wherein the first plate member and the second plate member are integrally formed by press processing.

5. A haptic feedback device comprising:
   a vibration member;
   a vibration element formed on the vibration member to vibrate the vibration member;
   a mass member formed on the vibration member to adjust an oscillation frequency of the vibration member; and
   a shock absorbing member formed between the vibration member and the mass member to prevent contact between the vibration member and the mass member.

6. The haptic feedback device of claim 5, wherein the shock absorbing member is formed on one surface of the vibration member.

7. The haptic feedback device of claim 5, wherein the shock absorbing member is formed with the mass member.

8. The haptic feedback device of claim 5, wherein one surface of the shock absorbing member is formed to have a curved shape.

9. A haptic feedback device comprising:
   a vibration member;
   a vibration element formed on the vibration member to vibrate the vibration member; and
   a mass member formed on the vibration member to adjust an oscillation frequency of the vibration member,
   wherein the vibration member includes a first plate member to which the vibration element is fixedly attached and a second plate member extended from the first plate member and housing the mass member, and
   wherein one surface of the second plate member facing the first plate member is formed to have a curved shape.

* * * * *